(12) United States Patent
Kulkarni et al.

(10) Patent No.: US 11,914,546 B2
(45) Date of Patent: Feb. 27, 2024

(54) CUSTOM PAYLOAD FILE FOR UPDATING DEVICES OF AN INFORMATION HANDLING SYSTEM

(71) Applicant: Dell Products L.P., Round Rock, TX (US)

(72) Inventors: Yogesh P. Kulkarni, Round Rock, TX (US); Chandrasekhar Mugunda, Austin, TX (US); Rui An, Austin, TX (US); Akshata Sheshagiri Naik, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 17/493,468

(22) Filed: Oct. 4, 2021

(65) Prior Publication Data

US 2023/0107593 A1    Apr. 6, 2023

(51) Int. Cl.
*G06F 13/42* (2006.01)
*G06F 8/61* (2018.01)
*G06F 11/14* (2006.01)
*G06F 8/654* (2018.01)
*G06F 9/4401* (2018.01)

(52) U.S. Cl.
CPC ............ *G06F 13/4295* (2013.01); *G06F 8/63* (2013.01); *G06F 8/654* (2018.02); *G06F 9/4401* (2013.01); *G06F 11/1433* (2013.01); *G06F 2213/0016* (2013.01)

(58) Field of Classification Search
CPC ........ G06F 13/4295; G06F 8/63; G06F 8/654; G06F 9/4401; G06F 11/1433; G06F 2213/0016

USPC .............................. 710/5, 8, 10, 23, 30, 104
See application file for complete search history.

(56) References Cited

U.S. PATENT DOCUMENTS

| | | | |
|---|---|---|---|
| 7,990,994 B1 * | 8/2011 | Yeh | H04L 12/4641 711/147 |
| 8,879,570 B2 * | 11/2014 | Nagapudi | H04L 12/12 370/420 |
| 10,346,187 B1 * | 7/2019 | Trier | G06F 9/455 |
| 11,023,220 B2 | 6/2021 | Samuel et al. | |
| 11,106,796 B2 | 8/2021 | Limonciello et al. | |
| 2007/0055793 A1 * | 3/2007 | Huang | G06F 13/102 710/8 |

(Continued)

*Primary Examiner* — Idriss N Alrobaye
*Assistant Examiner* — Henry W Yu
(74) *Attorney, Agent, or Firm* — Larson Newman, LLP

(57) ABSTRACT

An information handling system includes a memory and a baseboard management controller. The memory stores one or more device update packages, and each of the first device update packages includes an inter-integrated circuit payload. The baseboard management controller receives a first device update package, and stores the first device update package in the memory. In response to the first device update package being stored in the memory, the baseboard management controller launches a handler. The baseboard management controller retrieves a bus number and an address for a target device identified in the first device update package. The baseboard management controller parses data in a body of the inter-integrated circuit payload of the first device update package, and executes inter-integrated circuit commands in the body to provide a firmware image update to the target device.

20 Claims, 4 Drawing Sheets

(56) References Cited

U.S. PATENT DOCUMENTS

| | | | |
|---|---|---|---|
| 2007/0136501 A1* | 6/2007 | Chang | G06F 13/4291 711/115 |
| 2008/0183906 A1* | 7/2008 | Leigh | G06F 13/4022 710/8 |
| 2011/0191573 A1* | 8/2011 | Li | G06F 11/3058 713/2 |
| 2014/0123121 A1* | 5/2014 | Chiu | G06F 11/1433 717/168 |
| 2014/0280947 A1* | 9/2014 | Christopher | H04L 41/08 709/226 |
| 2018/0210724 A1* | 7/2018 | Su | G06F 8/65 |
| 2018/0314611 A1* | 11/2018 | Puthillathe | G06F 11/261 |
| 2020/0257521 A1* | 8/2020 | Jayakumar | G06F 9/4401 |

* cited by examiner

CUSTOM PAYLOAD FILE FOR UPDATING DEVICES OF AN INFORMATION HANDLING SYSTEM

FIELD OF THE DISCLOSURE

The present disclosure generally relates to a custom payload file for updating devices in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory and a baseboard management controller. The memory may store one or more device update packages, and each of the first device update packages includes an inter-integrated circuit payload. The baseboard management controller may receive a first device update package, and store the first device update package in the memory. In response to the first device update package being stored in the memory, the baseboard management controller may launch a handler. The baseboard management controller may retrieve a bus number and an address for a target device identified in the first device update package. The baseboard management controller may parse data in a body of the inter-integrated circuit payload of the first device update package, and execute inter-integrated circuit commands in the body to provide a firmware image update to the target device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
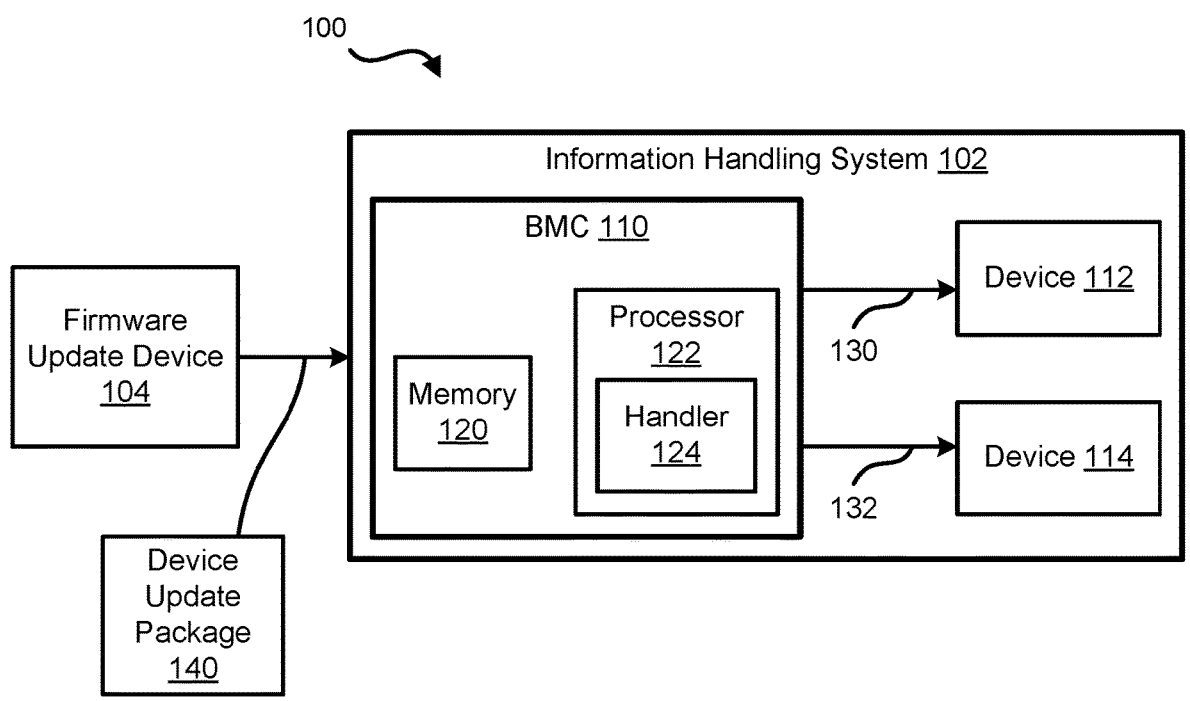
FIG. 1 is a diagram of a portion of a system including an information handling system according to at least one embodiment of the present disclosure.

FIG. 1 illustrates a portion of a system 100 including an information handling system 102 and a firmware update device 104 according to at least one embodiment of the present disclosure. Information handling system 102 includes a baseboard management controller (BMC) 110, and devices 112 and 114. In an example, each of devices 112 and 114 may be any suitable type device including, but not limited to, field programmable gate array and a complex programmable logic device. Firmware update device 104 may be any suitable device, such as a vendor firmware server. BMC 110 includes a memory 120 and may execute a handler 124 as described herein. BMC 110 may communicate with devices 112 and 114 via respective inter-integrated circuit (I2C) communication buses 130 and 132. Information handling system 102 and BMC 110 may each include additional components without varying from the scope of this disclosure. For example, information handling system 102 may include any number of devices over devices 112 and 114.

In an example, firmware update device 104 may provide a device update package (DUP) 140 to BMC 110 of information handling system 102. In previous information handling systems, when a BMC receives a DUP, the BMC may create a new handler to execute a firmware update on an associated device. In the previous information handling systems, the BMC may create a new handler for each DUP received, such that previous information handling systems may create a multiple update handlers. Information handling system 102 may be improved by BMC 110 creating a single handler 124 to execute commands in DUP 140 and perform a firmware update on one or devices 112 and 114. Single handler 124 may reduce an amount of resources, such as processor capabilities, within BMC 110 to update multiple devices 112 and 114 in information handling system 102.

In response to BMC 110 receiving DUP 140, the DUP may be stored within memory 120. In certain examples, BMC 110 may verify that DUP 140 is an acceptable format from firmware update device 104. For example, BMC 110 may create an interlock with firmware update device 104 to ensure DUP 140 is in an acceptable form. In an example, the storage or upload of DUP 140 may trigger processor 122 of BMC 110 to begin execution of the operations associated with handler 124. In certain examples, the operations/commands within DUP 140 may cause processor 122 to update firmware on device 112 or 114. For example, processor 122 may launch driver 124, which in turn may read data in a header and data in a body of a payload of DUP 140 as will be described with respect to FIG. 2 below.

Figure 2:
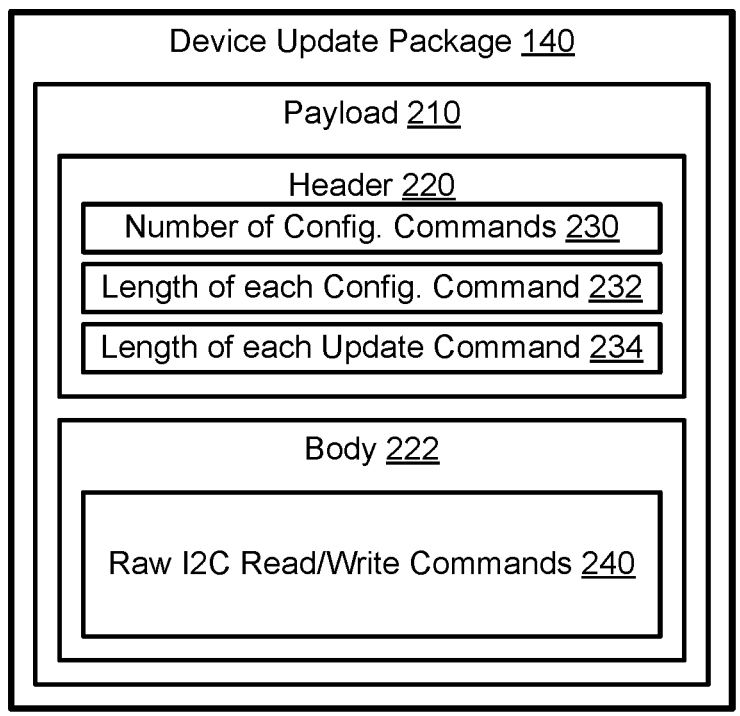
FIG. 2 is a device update packet according to at least one embodiment of the present disclosure.

FIG. 2 illustrates device update packet DUP 140 according to at least one embodiment of the present disclosure. DUP 140 includes a payload 210, which in turn includes a header 220 and a body 222. Header 220 includes data associated with the body 222 including, but not limited to, a number of configuration commands field 230, a length of each configuration command field 232, and a length of each update command field 234. Body 222 includes a block of read/write commands 240. In an example, read/write commands 240 may be any suitable commands to enable a BMC to update a device within an information handling system. For example, read/write commands 240 may by raw I2C commands to enable the BMC to provide the firmware update to the device via an I2C bus.

In an example, read/write commands 240 may contain update instructions for an associated device, such as device 112 or 114. For example, the update instructions may be included as raw I2C commands within body 222. Body 222 includes the firmware image to be flashed into the device, and may also include configuration I2C commands to be utilized by BMC 110 either before or after the firmware update. For example, the firmware update image may be embedding or included with I2C read/write commands 240. In an example, a bus number and address fields in payload 210 may be empty. Header 220 includes information to enable handler 124 to parse data in body 222. A firmware update executed based on DUP 140 will be described with respect to FIGS. 1 and 2.

In response to DUP 140 being stored in memory 120, processor 122 may execute handler 124 to retrieve information for the firmware update from header 220 within payload 210. In an example, header 220 may include an identity of the device to be updated, such as device 112. However, header 220 may not include the bus number or the address for device 112. In this situation, handler 124 may retrieve a bus number, such as I2C bus 130, and both physical and virtual addresses for the identified device, such as device 112 from any suitable source. For example, handler 124 may utilize an address table in memory 120 to retrieve the bus number and addresses for device 112. In an example, the address table may include a bus number, physical address, and virtual address for each device, such as devices 112 and 114, within information handling system 102. Based on the target identification in payload 210 and the retrieval of the target device virtual bus number and address from the target identification, single handler 124 may perform updates on any suitable number of devices within information handling system 102. In this situation, BMC 110 does not have to utilize additional computing resources to create multiple handlers.

Handler 124 may read the information in number of configuration commands field 230, length of each configuration command field 232, and length of each update command field 234 in header 220. Handler 124 may utilize this information as an input and may then execute read/write commands 240 in body 222, which in turn may enable processor 122 to transmit the firmware update image to device 112 via an I2C command over I2C bus 130. In an example, handler 124 may track the status of the firmware update. If handler 124 determines that the data transfer of the firmware image from BMC 110 to device 112 is not successful, the handler may determine a firmware update failure. Based on a firmware update failure, handler 124 may determine whether read/write commands 240 include firmware recovery commands. If so, handler 124 may perform one or more operations to provide firmware recovery to device 112.

Figure 3:
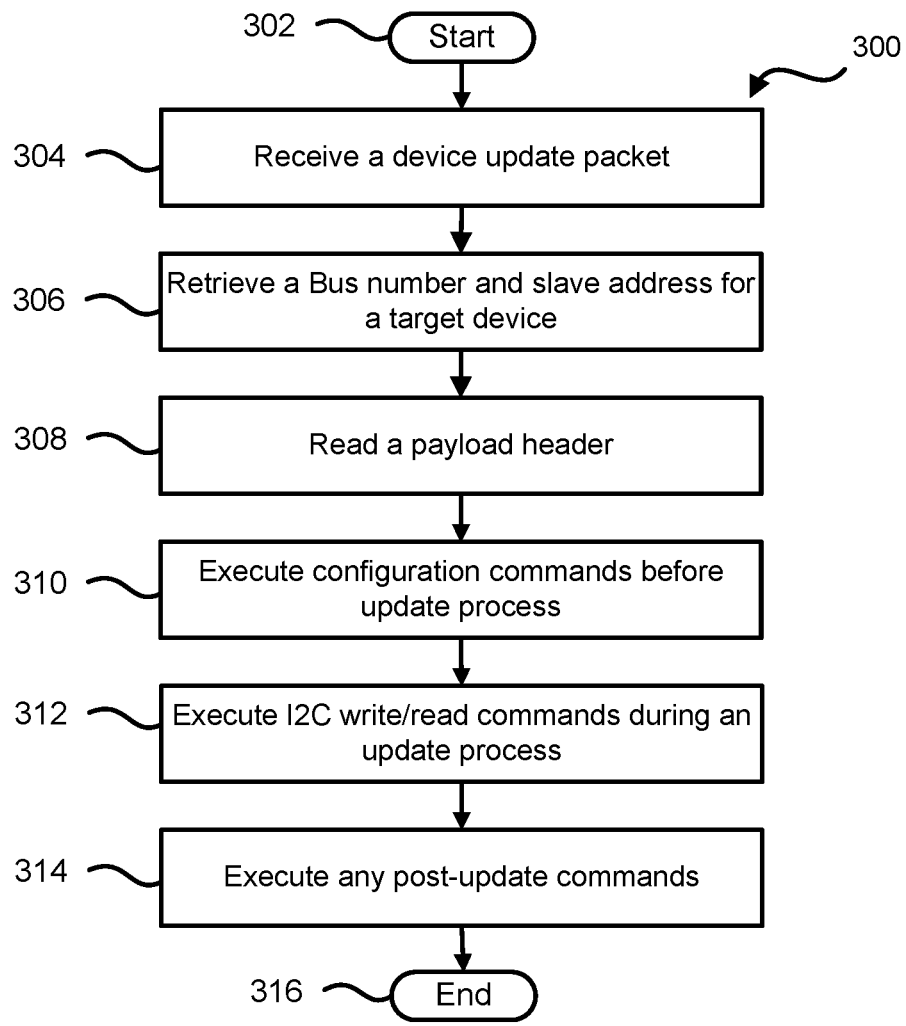
FIG. 3 is a diagram of a method for utilizing a custom payload file to update devices within an information handling system according to at least one embodiment of the present disclosure.

FIG. 3 shows a method 300 for utilizing a custom payload file to update devices within an information handling system according to at least one embodiment of the present disclosure, starting at block 302. Not every method step set forth in this flow diagram is always necessary, and certain steps of the methods may be combined, performed simultaneously, in a different order, or perhaps omitted, without varying from the scope of the disclosure. FIG. 3 may employ, in whole or in part, the components of information handling system 102 of FIG. 1, or any other type of system, controller, device, module, processor, or any combination thereof, operable to employ all, or portions of, the method of FIG. 3.

At block 304, a device update packet (DUP) is received. In an example, a BMC may receive the DUP and may receive the package from any suitable source device, such as a vendor of a particular device to be updated. The DUP may include a data associated with a firmware update for a device within an information handling system. At block 306, a bus number and address for a target device is retrieved. The bus number and address may be retrieved from any suitable portion of the DUP. At block 308, a payload header is read. In an example, the payload header may include any suitable data including, but not limited to, a number of configuration commands in a body of the DUP, a length of each configuration command in the body, and a length of each update command in the body.

At block 310, configuration commands are executed before an update process is performed. In an example, a BMC may execute the configuration commands based on the data in the payload, such as the length of the configuration commands and the length of each configuration command. At block 312, I2C write/read commands are executed during an update process. At block 314, any post-update commands are executed, and the method ends at block 316.

Figure 4:
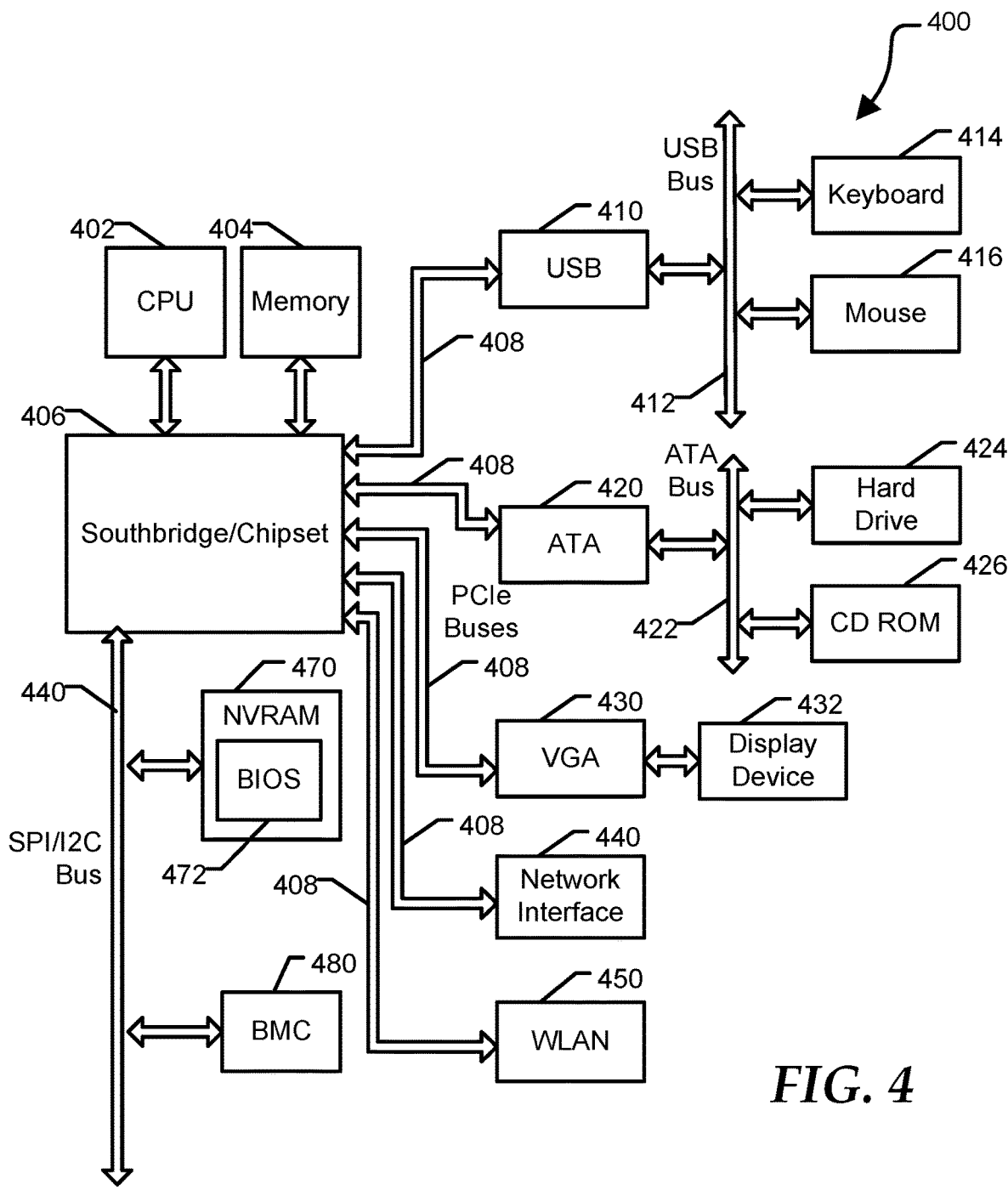
FIG. 4 is a block diagram of a general information handling system according to an embodiment of the present disclosure.

FIG. 4 shows a general information handling system 400. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 400 including a processor 402, a memory 404, a southbridge/chipset 406, one or more PCIe buses 408, a universal serial bus (USB) controller 410, a USB 412, a keyboard device controller 414, a mouse device controller 416, a configuration an ATA bus controller 420, an ATA bus 422, a hard drive device controller 424, a compact disk read only memory (CD ROM) device controller 426, a video graphics array (VGA) device controller 430, a network interface controller (NIC) 440, a wireless local area network (WLAN) controller 450, a serial peripheral interface (SPI) bus 460, a NVRAM 470 for storing BIOS 472, and a baseboard management controller (BMC) 480. In an example, chipset 406 may be directly connected to an individual end point via a PCIe root port within the chipset and a point-to-point topology as shown in FIG. 4. BMC 480 can be referred to as a service processor or embedded controller (EC). Capabilities and functions provided by BMC 480 can vary considerably based on the type of information handling system. For example, the term baseboard management system is often used to describe an embedded processor included at a server, while an embedded controller is more likely to be found in a consumer-level device. As disclosed herein, BMC 480 represents a processing device different from CPU 402, which provides various management functions for information handling system 400. For example, an embedded controller may be responsible for power management, cooling management, and the like. An embedded controller included at a data storage system can be referred to as a storage enclosure processor.

System 400 can include additional processors that are configured to provide localized or specific control functions, such as a battery management controller. Bus 460 can include one or more busses, including a SPI bus, an I2C bus, a system management bus (SMBUS), a power management bus (PMBUS), and the like. BMC 480 can be configured to provide out-of-band access to devices at information handling system 400. As used herein, out-of-band access herein refers to operations performed prior to execution of BIOS 472 by processor 402 to initialize operation of system 400.

BIOS 472 can be referred to as a firmware image, and the term BIOS is herein used interchangeably with the term firmware image, or simply firmware. BIOS 472 includes instructions executable by CPU 402 to initialize and test the hardware components of system 400, and to load a boot loader or an operating system (OS) from a mass storage device. BIOS 472 additionally provides an abstraction layer for the hardware, such as a consistent way for application programs and operating systems to interact with the keyboard, display, and other input/output devices. When power is first applied to information handling system 400, the system begins a sequence of initialization procedures. During the initialization sequence, also referred to as a boot sequence, components of system 400 are configured and enabled for operation, and device drivers can be installed. Device drivers provide an interface through which other components of the system 400 can communicate with a corresponding device.

Information handling system 400 can include additional components and additional busses, not shown for clarity. For example, system 400 can include multiple processor cores, audio devices, and the like. While a particular arrangement of bus technologies and interconnections is illustrated for the purpose of example, one of skill will appreciate that the techniques disclosed herein are applicable to other system architectures. System 400 can include multiple CPUs and redundant bus controllers. One or more components can be integrated together. For example, portions of southbridge/chipset 406 can be integrated within CPU 402. Additional components of information handling system 400 can include one or more storage devices that can store machine-executable code, one or more communications ports for communicating with external devices, and various input and output (I/O) devices, such as a keyboard, a mouse, and a video display. An example of information handling system 400 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

In an example, information handling system 400 may be any suitable device including, but not limited to, information handling system 100 of FIG. 1. Information handling system 400 can include a set of instructions that can be executed to cause the information handling system to perform any one or more of the methods or computer based functions disclosed herein. The information handling system 400 may operate as a standalone device or may be connected to other computer systems or peripheral devices, such as by a network.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or sub-systems that individually or jointly execute a set, or multiple sets, of instructions to perform one or more computer functions.

The information handling system 400 can include a disk drive unit and may include a computer-readable medium, not shown in FIG. 4, in which one or more sets of instructions, such as software, can be embedded. Further, the instructions may embody one or more of the methods or logic as described herein. In a particular embodiment, the instructions may reside completely, or at least partially, within system memory 404 or another memory included at system 400, and/or within the processor 402 during execution by the information handling system 400. The system memory 404 and the processor 402 also may include computer-readable media.

While the computer-readable medium 436 of information handling system 400 is shown in FIG. 4 to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a memory to store one or more device update packages, wherein the device update packages include an inter-integrated circuit payload; and
   a baseboard management controller to communicate with the memory, the baseboard management controller to:
      receive a first device update package;
      store the first device update package in the memory;
      in response to the first device update package being stored in the memory, launch a handler; and
      during execution of the handler, the baseboard management controller to:
         identify, from a header of the first device update package, a target device associated in the first device update package;
         retrieve, from an address table in the memory, a bus number and an address for the target device identified in the first device update package;
         execute configuration inter-integrated circuit commands;
         based on the execution of the configuration inter-integrated circuit commands, parse data in a body of the inter-integrated circuit payload of the first device update package; and
         execute inter-integrated circuit commands in the body to provide a firmware image update to the target device based on the bus number and the address for the target device.

2. The information handling system of claim 1, wherein the baseboard management controller further to:
   track a status of the firmware image update;
   in response to a failure of the firmware image update, determine whether the body of the inter-integrated circuit payload include recovery commands; and
   in response to the body of the inter-integrated circuit payload including the recovery commands, perform a firmware recovery for the target device.

3. The information handling system of claim 1, wherein prior to the data in the body being parsed, the baseboard management controller further to:

read data in the header of the inter-integrated circuit payload, wherein the data in the header includes information on parsing the data in the body.

4. The information handling system of claim 3, wherein the header of the inter-integrated circuit payload includes a plurality of fields to store the data for the information on parsing the data in the body.

5. The information handling system of claim 4, wherein the plurality of fields includes a number of configuration commands field, a length of each configuration command field, and a length of each update command field.

6. The information handling system of claim 1, wherein the baseboard management controller further to:
receive a second device update package;
store the second device update package in the memory;
in response to the second device update package being stored in the memory, launch the handler; and
during execution of the handler, the baseboard management controller to:
retrieve a second bus number and a second address for a second target device identified in the second device update package;
parse data in a second body of a second inter-integrated circuit payload of the second device update package; and
execute second inter-integrated circuit commands in the second body to provide a firmware image update to the second target device.

7. The information handling system of claim 1, wherein the body of the inter-integrated circuit payload includes the firmware update image.

8. The information handling system of claim 1, wherein a bus number field and an address fields in the header of the inter-integrated circuit payload are empty.

9. A method comprising:
storing, by a baseboard management controller of an information handling system, a first device update package that includes an inter-integrated circuit payload in a memory of the information handling system;
in response to the first device update package being stored in the memory, launching a handler; and
during execution of the handler:
identifying, from a header of the first device update package, a target device associated in the first device update package;
retrieving, from an address table in the memory, a bus number and an address for the target device identified in the first device update package;
executing configuration inter-integrated circuit commands;
based on the executing of the configuration inter-integrated circuit commands, parsing data in a body of the inter-integrated circuit payload of the first device update package; and
executing inter-integrated circuit commands in the body to provide a firmware image update to the target device based on the bus number and the address for the target device.

10. The method of claim 9, further comprising:
tracking a status of the firmware image update;
in response to a failure of the firmware image update, determining whether the body of the inter-integrated circuit payload include recovery commands; and
in response to the body of the inter-integrated circuit payload including the recovery commands, performing a firmware recovery for the target device.

11. The method of claim 9, wherein prior to the data in the body being parsed, the method further comprises:
reading data in the header of the inter-integrated circuit payload, wherein the data in the header includes information on parsing the data in the body.

12. The method of claim 11, wherein the header of the inter-integrated circuit payload includes a plurality of fields to store the data for the information on parsing the data in the body.

13. The method of claim 12, wherein the plurality of fields includes a number of configuration commands field, a length of each configuration command field, and a length of each update command field.

14. The method of claim 9, further comprising:
receiving a second device update package;
storing the second device update package in the memory;
in response to the second device update package being stored in the memory, launching the handler; and
during execution of the handler, the baseboard management controller to:
retrieving a second bus number and a second address for a second target device identified in the second device update package;
parsing data in a second body of a second inter-integrated circuit payload of the second device update package; and
executing second inter-integrated circuit commands in the second body to provide a firmware image update to the second target device.

15. The method of claim 9, wherein the body of the inter-integrated circuit payload includes the firmware update image.

16. The method of claim 9, wherein a bus number field and an address fields in the header of the inter-integrated circuit payload are empty.

17. An information handling system comprising:
a memory to store one or more device update packages, wherein the device update packages include an inter-integrated circuit payload; and
a baseboard management controller to communicate with the memory, the baseboard management controller to:
store a first device update package in the memory, wherein a bus number field and an address fields in the header of the inter-integrated circuit payload are empty;
in response to the first device update package being stored in the memory, launch a handler; and
during execution of the handler, the baseboard management controller to:
identify, from a header of the first device update package, a target device associated in the first device update package;
retrieve, from an address table in the memory, a bus number and an address for the target device identified in the first device update package;
execute configuration inter-integrated circuit commands;
based on the execution of the configuration inter-integrated circuit commands, parse data in a body of the inter-integrated circuit payload of the first device update package wherein the body of the inter-integrated circuit payload includes a firmware update image; and
execute inter-integrated circuit commands in the body to provide the firmware image update to the target device based on the bus number and the address for the target device.

18. The information handling system of claim 17, wherein the baseboard management controller further to:
- receive a second device update package;
- store the second device update package in the memory;
- in response to the second device update package being stored in the memory, launch the handler; and
- during execution of the handler, the baseboard management controller to:
  - retrieve a second bus number and a second address for a second target device identified in the second device update package;
  - parse data in a second body of a second inter-integrated circuit payload of the second device update package; and
  - execute second inter-integrated circuit commands in the second body to provide a firmware image update to the second target device.

19. The information handling system of claim 17, wherein the baseboard management controller further to:
- track a status of the firmware image update;
- in response to a failure of the firmware image update, determine whether the body of the inter-integrated circuit payload include recovery commands; and
- in response to the body of the inter-integrated circuit payload including the recovery commands, perform a firmware recovery for the target device.

20. The information handling system of claim 17, wherein prior to the data in the body being parsed, the baseboard management controller further to:
- read data in the header of the inter-integrated circuit payload, wherein the data in the header includes information on parsing the data in the body.

* * * * *